T. SHIPLEY.
CONDENSER FOR ICE MAKING AND REFRIGERATING MACHINES.
APPLICATION FILED MAY 31, 1917.
1,234,639.
Patented July 24, 1917.
4 SHEETS—SHEET 1.
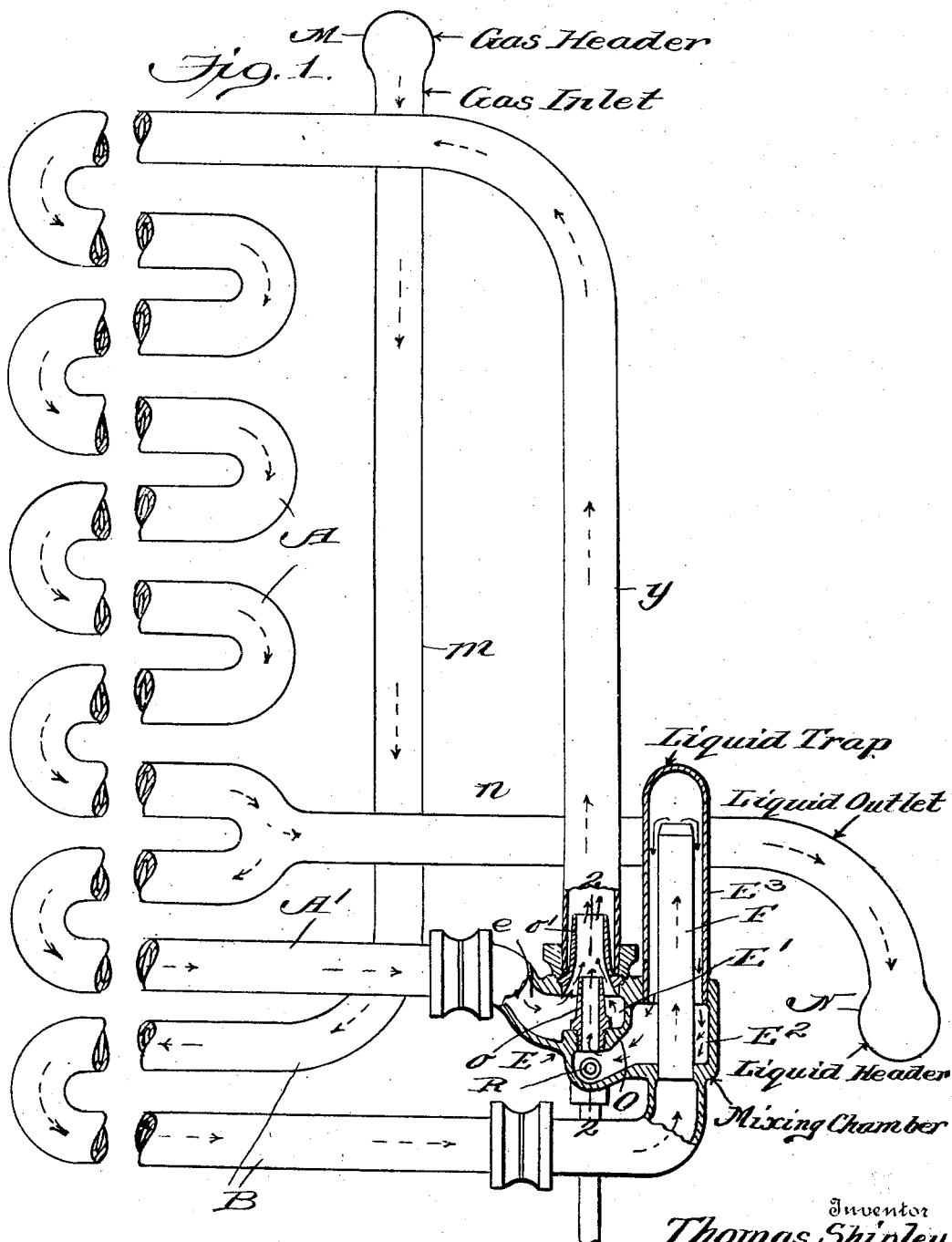

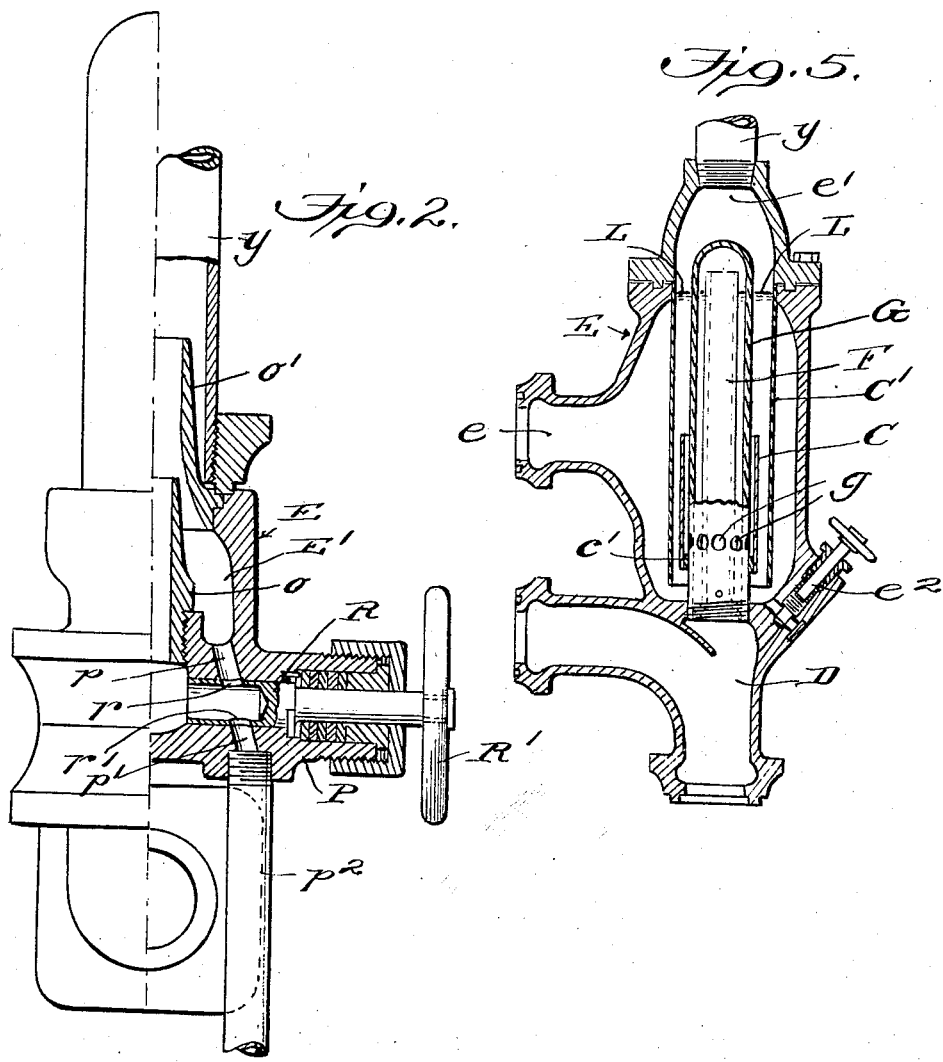

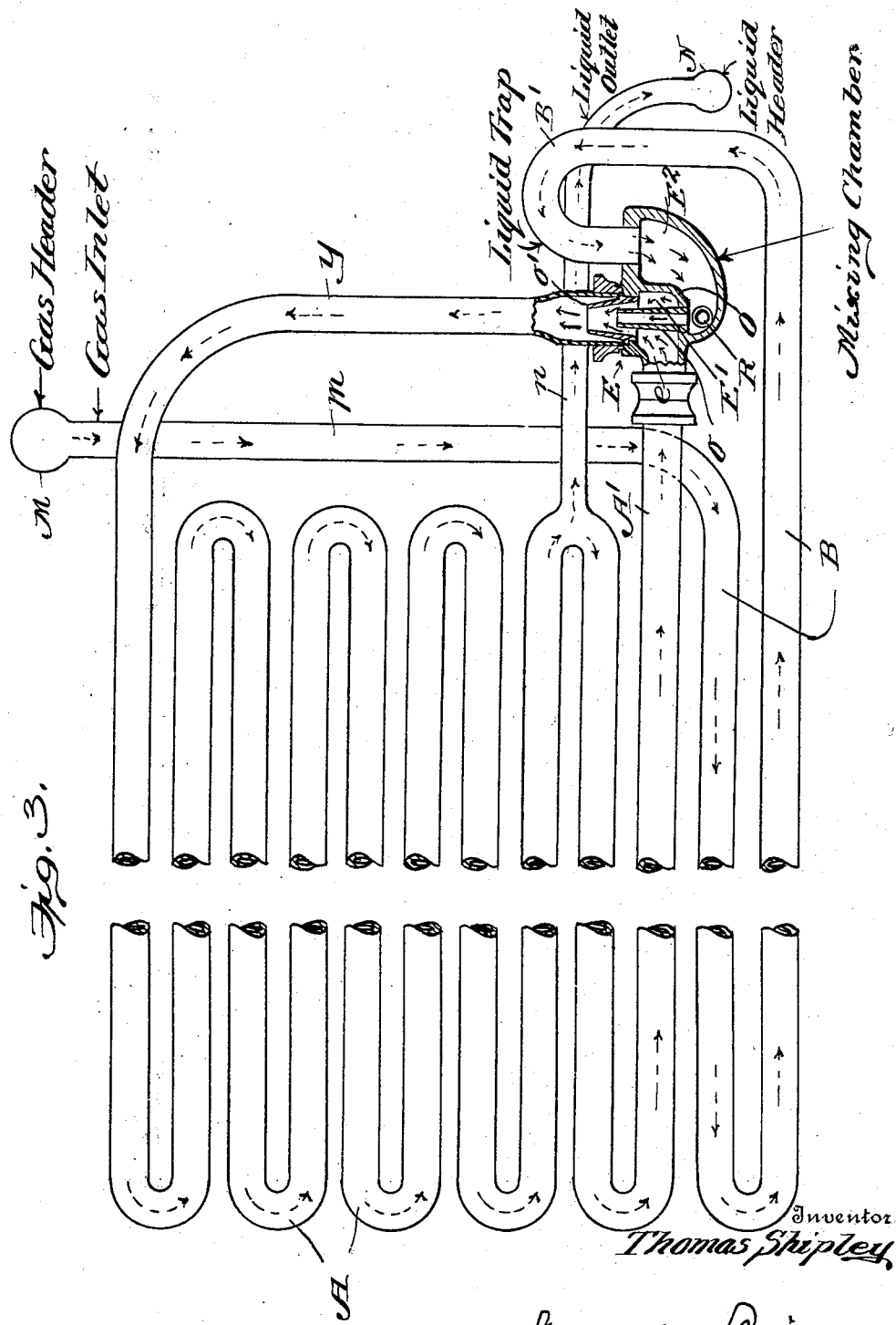

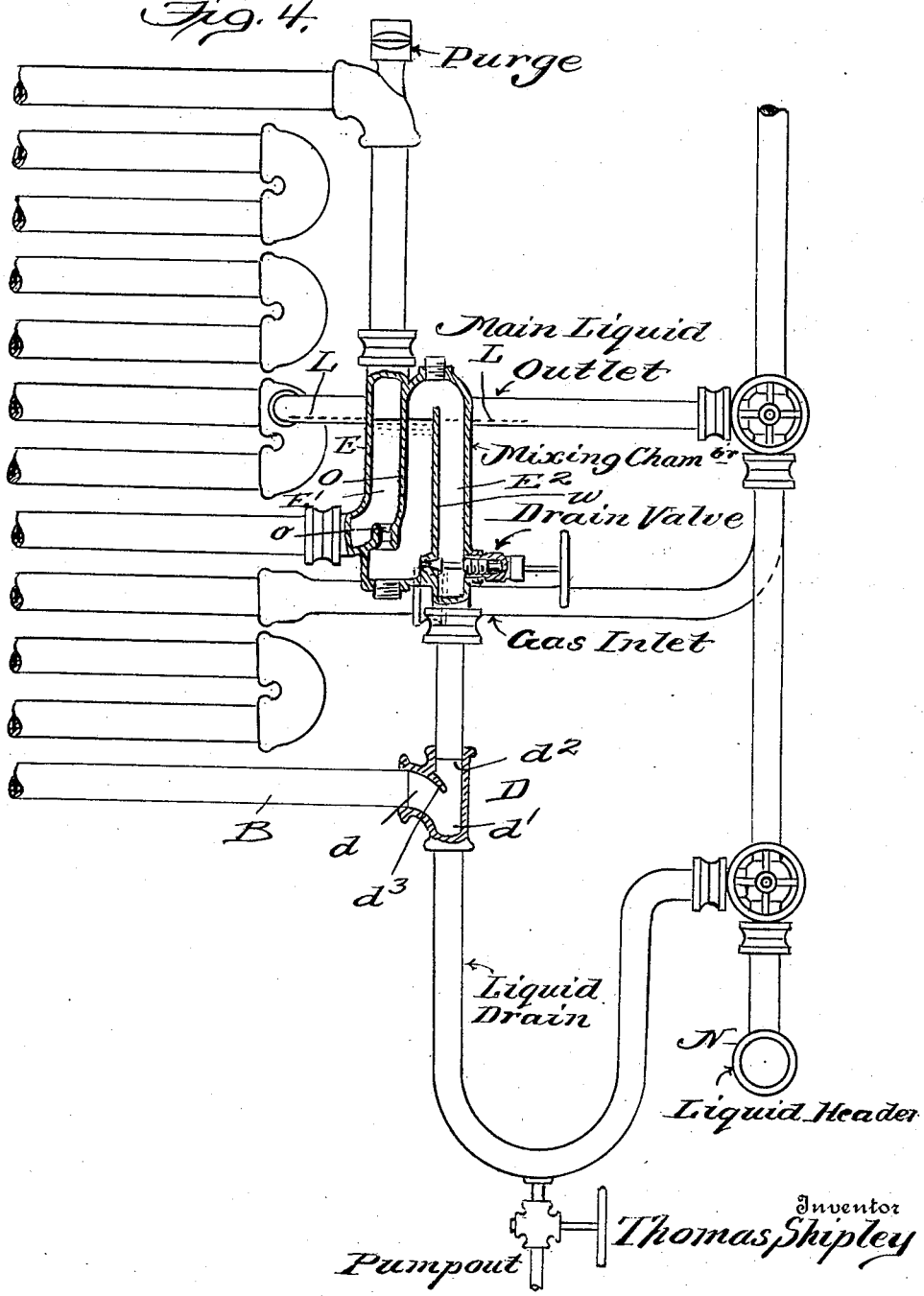

UNITED STATES PATENT OFFICE.

THOMAS SHIPLEY, OF YORK, PENNSYLVANIA.

CONDENSER FOR ICE-MAKING AND REFRIGERATING MACHINES.

1,234,639. Specification of Letters Patent. Patented July 24, 1917.

Application filed May 31, 1917. Serial No. 171,925.

*To all whom it may concern:*

Be it known that I, THOMAS SHIPLEY, a citizen of the United States, and a resident of the city of York, in the county of York and State of Pennsylvania, have invented certain new and useful Improvements in Condensers for Ice-Making and Refrigerating Machines, of which the following is a specification.

This application, so far as concerns the subject matter of claim 1 of the same, is a continuation of my application for improvements in ice making and refrigerating machines Serial No. 140,988, filed January 6, 1917.

My invention relates to condensers for ice making plants, and more particularly to that type of condensers, known as flooded condensers, in which the gas—usually ammonia gas—to be condensed is injected directly into a body of liquid constantly renewed and maintained at a level above the gas injecting point by liquid supplied from that end of the condenser which contains the liquid of condensation, as described and claimed in my Patent No. 1,079,610 of November 25, 1913.

My invention has to do with the mixing chamber which contains the gas injecting nozzle and the constantly maintained body of liquid drawn from the liquid containing portion of the condenser into which the gas under pressure is injected and is thereby condensed.

Under my invention, the condenser body, the mixing chamber and connections between the liquid containing portion of the condenser and the mixing chamber for maintaining in the latter a body of liquid at a predetermined level are combined with a gas injecting nozzle in said mixing chamber having its discharge orifice below the level of the liquid and a conduit through which gas under pressure is supplied to said nozzle, formed as a reversed U trap the top of the return bend of which stands above the level of the liquid, thus preventing the escape of the liquid contents of the mixing chamber through the nozzle and the gas supply conduit connected to the same, which might otherwise occur when the condenser is out of operation. It is this feature which mainly characterizes my invention.

To enable those skilled in the art to understand and use my invention I shall proceed to describe the manner in which the same is or may be carried into effect by reference to the accompanying drawings, in which Figure 1 is a sectional side elevation of so much of a coil condenser of the flooded type embodying my improvement in its preferred form as needed for the purposes of explanation, the coil being broken away between its ends to economize space.

Fig. 2 is a vertical section partly in elevation on line 2—2, Fig. 1, designed to show more particularly the means for draining the liquid containing portion of the mixing chamber. Figs. 3, 4, and 5 are vertical sections partly in elevation of modified forms of mixing chambers and the devices immediately associated therewith.

Referring to Fig. 1, A is a condensing coil of the flooded type, having its bottom stretch A' connected to its top stretch through the intermediary of the mixing chamber E connected on the one hand to the bottom stretch A', and on the other hand to a riser $y$, which leads from the top of the mixing chamber to the top stretch of the coil. B is a pre-cooler, such as usually associated with coil condensers, composed of two stretches, the top one connected by pipe $m$ to the gas header M, and the bottom one connected to the mixing chamber. N is the liquid header into which leads the main liquid outlet pipe $n$ from the condensing coil.

The mixing chamber E which contains the body of condensed ammonia liquid is provided with a lateral inlet $e$ connected as shown to a portion of the condenser coil A which is below the level of the main liquid outlet $n$, and which therefore is kept filled with liquid during the operation of the condenser. Through this inlet $e$, which in this instance is connected to the bottom stretch A' of the condenser coil, liquid from the coil freely enters and fills the mixing chamber, or that portion of the same in which the liquid is contained, to a height coincident with the level of the liquid outlet $n$, and maintains the body of liquid in said chamber at that level indicated by the broken line L, L, Fig. 4, which level is the same in all the different forms of my invention illustrated in the drawings.

The mixing chamber E is divided by a diaphragm O into two compartments, which communicate with one another through a nozzle in the floor of said diaphragm, the one E' directly communicating with the inlet e, and constantly filled with liquid up to the level L, L, whether the condenser be in action or not, the other E² containing the stand pipe F, which is set in an opening in the floor of E², and is connected to, and receives gas from, the bottom stretch of the pre-cooler B, said compartment E² being filled with liquid only when the supply of gas under pressure is stopped, and the condenser consequently is out of action. Whenever and so long as the condenser is in action, the pressure of the entering gas will drive the liquid out from the compartment E² through the nozzle in the diaphragm O into the liquid containing compartment E'. The nozzle in the present instance is somewhat like an ejector for handling water, consisting of a gas nozzle o set upright in an opening in the floor of the diaphragm O, and a combining tube o', secured in the outlet in the top of the mixing chamber E from which the riser y extends there being an annular space between the two, as usual in this class of devices, for the passage of the liquid drawn upward therethrough by the force of the incoming gas jet to mingle therewith, the resultant product discharging from the combining tube into the riser y, through which it is conducted to the top stretch of the condenser coil.

In order to prevent the ammonia liquid, which when the condenser is out of action passes over from the compartment E' into the compartment E², from overflowing into the stand pipe F and thus escaping from chamber E, the said stand pipe F is of such height that its top, as seen in Fig. 1, stands some distance above the level L—L of the liquid in the mixing chamber, thus effectively trapping the liquid. For this purpose the stand pipe extends up into a domelike extension E³ of the top of compartment E², there being an annular space between the upper portion of the stand pipe and its surrounding dome through which the gas which issues from the top of the stand pipe can pass down into the body of the compartment below and thence to the ejector in the liquid compartment E'.

Thus the stand pipe and the compartment E² constitute in effect a continuous conduit for serving gas to a nozzle in the mixing chamber below the level of the body of liquid contained therein, which is formed as, or with, a reversed U trap the top of the return bend of which is above the level of said body of liquid, thus preventing possibility of back flow of that liquid through the conduit, when the supply of gas is cut-off and the condenser is out of action.

Associated with the mixing chamber is a drain cock R shown more clearly in Fig. 2. It is a component part of the fitting and its hollow barrel or body and stem are contained in a case P which forms an integral part of the mixing chamber casting. The casing opens into the chamber E² just under that part of the diaphragm O in which the gas injecting nozzle is located as indicated in Fig. 1, which shows at R the inner open end of the tubular body of the cock at that point. The cock is held in its casing by a suitable stuffing box, through which travels the stem of the cock, having on its outer end an operating handle R'. In the walls of the tubular body of the cock are two diametrically opposite ports r, r', which communicate with one another through the hollow interior of the same, and are designed to operate in connection with two corresponding ports p, p', in the walls of the casing P—the port p opening into the bottom of the liquid compartment E' of the mixing chamber and the port p' leading to the outside where it communicates with a pipe p² through which the drainage is carried off to the liquid header N or other suitable receiver. The open inner end of the tubular body of the cock, opens into the lower part of the compartment E² as shown in Fig. 1, at which point the bottom of the compartment is depressed somewhat like a basin to serve as a catch-all for whatever liquid there may be in that compartment, this liquid flowing thence into and through the hollow body of the cock, and out through the ports r', p' into the drain pipe p².

In the modification shown in Fig. 3, the stand pipe F and dome like extension E³ of the mixer shown in Fig. 1 are dispensed with; the opening in the floor of the compartment E² through which the gas from the lower stretch of the pre-cooler B is supplied to the stand pipe is closed; and in lieu of this the gas is conducted directly through an extension of the lower stretch of the pre-cooler B to the mixing chamber, this extension of the pre-cooler as indicated at B', rising above the mixing chamber in the form of a reversed U trap, the return, or down, leg of which enters the top of the compartment E² and forms in effect an upward continuation of the same. Otherwise the arrangement is the same as in Fig. 1. Like letters of reference indicate corresponding parts in the two figures.

The top of the return bend of the reversed U trap B' is above the level of the main liquid outlet n of the condenser coil just as it is in the form of trap device shown in Fig. 1, for the same purpose, and with the same mode of operation.

In the modification represented in Fig. 4, the mixing chamber E, is divided by a diaphragm O into two compartments E' and E² as in Fig. 1 and for the same purpose, with a corresponding nozzle o in the bottom of the compartment E' for the discharge of the gas from compartment E² into the liquid contained in compartment E'. In the compartment E² is erected a baffle, or partition w, which extends vertically from the bottom of the compartment to near the top thereof, leaving between the said partition and the adjoining side wall of the compartment, a passage corresponding to the stand pipe F in Fig. 1 for the gas which is supplied from the lowest stretch of the pre-cooler B through connections which will be presently described. The entering gas passes up one side of the partition over the top and down the other side of the same just as it would in the stand pipe F arrangement in Fig. 1.

The top of the partition w stands above the level, L—L, of the liquid in the mixing chamber to prevent back flow into the gas inlet passage F of the liquid which may enter compartment E² when the condenser is not in operation, and thus the partition w in conjunction with the compartment E², provides a gas conduit furnished with a reversed U trap, the top of the return bend of which is above the level of the body of liquid in the mixing chamber.

In the present instance, for the purpose of separating the gas from entrained liquid before passing it to the mixing chamber, the bottom stretch for the pre-cooler is connected at $d$, to a separating chamber D having a bottom outlet $d'$ connected by a U trap drain with the liquid header N for the disposal of the entrained liquid which may be separated out from the gas passing into and through said chamber; a top outlet for the escape of the gas thus freed from entrained liquid connected by a pipe, as shown, to the gas inlet in the bottom of the mixing chamber above; and a baffle $d^3$ which directs downward the entering mixture of gas and entrained liquid, the entrained liquid dropping down to outlet $d'$, and the gas thus freed from liquid passing around the lower edge of the baffle and thence upward to the gas outlet $d^2$. This separating chamber feature, however, is not here claimed, as it forms the subject of another application for Letters Patent in my name filed of even date herewith and bearing Serial No. 171,924. A suitable drainage arrangement similar to that employed in connection with the mixing chamber in Fig. 1 may be provided for this modification as will be understood without further explanation.

In the modification shown in Fig. 5, I have omitted the condenser and all pipe connections between it and the mixing chamber, those connections being the same as in the preceding illustrations. In this figure the mixing chamber E is represented as in one unitary casting with a separating chamber D such as shown in the last preceding figure.

The inlet $e$ of the mixing chamber is connected, as in the preceding modifications, to the liquid containing portion of the condenser coil, the liquid entering and filling the mixing chamber up to the level L—L which is coincident with the level of the liquid in the main liquid outlet in the condenser coil. The outlet $e'$ in the top of the mixing chamber is connected by a riser, such as riser $y$ in the preceding figures, with the top stretch of the condenser coil; and at $e^2$ is a drain valve controlling an outlet from the bottom of the mixing chamber into the separating chamber D below. The gas conduit and reversed U trap therein are formed by the stand pipe F set in the floor of the chamber and receiving the gas from the separating chamber D, and of such height that its open upper end extends above the level L of the liquid in the mixing chamber, and the concentric jacket G surrounding the stand pipe and closed at the top so as to inclose not only the sides but the upper end of the stand pipe and of greater diameter than the latter, leaving between them an annular space for the downward passage of the gas which passes over the top of the stand pipe. Apertures $g$ are formed in the jacket at or near its lower end for the escape of the gas into the narrow annular space between the jacket and an upright deflector tube C secured in place by a spacing ring $c'$ interposed between the jacket and the deflector at a point below the openings $g$, and united to the two by a soldered joint which closes the lower end of the deflector against the passage of gas. The upper end of the deflector terminates below the level L—L of the liquid in the mixing chamber. Thus the constricted annular space between the jacket and the deflector is in effect an annular nozzle through which the gas under pressure issuing from the openings $g$ is forcibly directed upward as an annular jet into the body of liquid in the mixing chamber and toward the outlet $e'$ in the top of the mixing chamber. In order to still further insure the proper upward passage of the gas through the mixing chamber, I interpose between the deflector C and the inlet $e$ a cylindrical baffle C' which is secured by a tight joint to the dome shaped top of the mixing chamber and extends down as a curtain between the deflector and the walls of the mixing chamber. Under the arrangement described it is apparent without further explanation that the stand pipe and the jacket surrounding the same constitute a gas conduit formed as a trap the top of whose return bend is above the level of the liquid in the mixing chamber, thus preventing back flow of the liquid in the mixing chamber into and down through the stand pipe when the condenser is not in action.

The two forms of mixing chamber shown in Figs. 4 and 5, are also illustrated in my hereinbefore referred to application Serial No. 171,924.

Having described my improvement and the best way now known to me of carrying the same into practical effect I state in conclusion that I do not limit my claim to the structural details hereinbefore shown and set forth in illustration of my invention, since manifestly the same can be variously modified without departure from the spirit of the invention; but what I claim herein as new and desire to secure by Letters Patent is as follows:

1. In a condenser of the flooded type for ice making and refrigerating machinery, the combination with the condenser body, the mixing chamber and connections between the liquid containing portion of the condenser and the mixing chamber for maintaining in the latter a body of liquid at a predetermined level, of a gas injecting nozzle in said mixing chamber having its discharge orifice below the level of the liquid therein, and a conduit through which gas under pressure is supplied to said nozzle, formed as a reversed U trap the top of the return bend of which stands above the level of the liquid in said mixing chamber, substantially as and for the purposes hereinbefore set forth.

2. In the condenser of the flooded type, the combination with the condenser body of a mixing chamber divided into two compartments $E'$, $E^2$, compartment $E'$ having an outlet connected to the upper portion of the condenser, and an inlet connected to the lower and liquid containing portion of the condenser for maintaining in the mixing chamber a body of liquid at a predetermined level; a gas injecting nozzle in compartment $E'$ communicating through a port in the floor of the same with compartment $E^2$, the discharge orifice of the nozzle being below the level of the body of liquid in the mixing chamber; and a stand pipe in compartment $E^2$ connected at its lower end with a source of supply of gas under pressure, and extending up into a tubular dome like extension $E^3$ of said compartment to such height that its upper end is above the level of the liquid in the mixing chamber, substantially as and for the purposes hereinbefore set forth.

3. A structure such as specified in claim 2, in which the nozzle consists of a gas injecting nozzle set up on the floor of compartment $E'$, and a combining tube set in the outlet at the top of the same.

4. In combination with the elements of the combination specified in claim 2, a drain cock located in the side of the mixing chamber and provided with drain ports communicating with both of the two compartments $E'$, $E^2$.

In testimony whereof I hereto affix my signature.

THOMAS SHIPLEY.

Copies of this patent may be obtained for five cents each, by addressing the "Commissioner of Patents, Washington, D. C."